United States Patent
Farchi et al.

(10) Patent No.: US 10,452,525 B2
(45) Date of Patent: Oct. 22, 2019

(54) UTILIZING SEMANTIC CLUSTERS TO PREDICT SOFTWARE DEFECTS

(71) Applicant: International Business Machines Corporation, Armonk, NY (US)

(72) Inventors: Eitan Daniel Farchi, Pardes-Hana (IL); Andre Heilper, Haifa (IL); Aviad Zlotnick, Mitzpeh Netofah (IL)

(73) Assignee: International Business Machines Corporation, Armonk, NY (US)

(*) Notice: Subject to any disclaimer, the term of this patent is extended or adjusted under 35 U.S.C. 154(b) by 169 days.

(21) Appl. No.: 15/186,556

(22) Filed: Jun. 20, 2016

(65) Prior Publication Data

US 2016/0299838 A1 Oct. 13, 2016

Related U.S. Application Data

(63) Continuation of application No. 14/324,191, filed on Jul. 6, 2014, now abandoned.

(51) Int. Cl.
   *G06F 9/44* (2018.01)
   *G06F 11/36* (2006.01)
   (Continued)

(52) U.S. Cl.
   CPC ...... *G06F 11/3692* (2013.01); *G06F 11/3616* (2013.01); *G06F 11/3684* (2013.01);
   (Continued)

(58) Field of Classification Search
   CPC .. G06F 11/3688; G06F 11/008; G06F 11/368; G06F 11/3684; G06F 8/71
   See application file for complete search history.

(56) References Cited

U.S. PATENT DOCUMENTS

| | | | |
|---|---|---|---|
| 6,539,501 B1 * | 3/2003 | Edwards | G06F 11/3466 714/38.13 |
| 7,503,037 B2 | 3/2009 | Banerjee et al. | |

(Continued)

OTHER PUBLICATIONS

Runeson et al., "What Do We Know about Defect Detection Methods?", IEEE Software, vol. 23, Issue 3, pp. 82-90, May-Jun. 2006.

(Continued)

*Primary Examiner* — Chat C Do
*Assistant Examiner* — Lenin Paulino
(74) *Attorney, Agent, or Firm* — Ziv Glazberg

(57) ABSTRACT

A method, apparatus and product for utilizing semantic clusters to predict software defects. The method comprising: obtaining a plurality of software elements that are associated with a version of a System Under Test (SUT), wherein the plurality of software elements comprise defective software elements which are associated with a defect in the version of the SUT; defining, by a processor, a plurality of clusters, wherein each cluster of the plurality of clusters comprises software elements having an attribute, wherein the attribute is associated with a functionality of the SUT; and determining a score of each cluster of the plurality of clusters, wherein the score of a cluster is based on a relation between a number of defect software elements in the cluster and a number of software elements in the cluster.

12 Claims, 3 Drawing Sheets

(51) Int. Cl.
*G06N 20/00* (2019.01)
*G06N 7/00* (2006.01)

(52) U.S. Cl.
CPC ......... *G06F 11/3688* (2013.01); *G06N 7/005* (2013.01); *G06N 20/00* (2019.01)

(56) References Cited

U.S. PATENT DOCUMENTS

| | | | |
|---|---|---|---|
| 7,725,774 | B2 | 5/2010 | Ward |
| 7,890,814 | B2 | 2/2011 | Zhang et al. |
| 8,151,146 | B2 | 4/2012 | Ostrand et al. |
| 2011/0022551 | A1 | 1/2011 | Dixon |
| 2011/0055620 | A1 | 3/2011 | Sengupta |
| 2012/0317554 | A1 | 12/2012 | Mulat |
| 2013/0031423 | A1 | 1/2013 | Barrow et al. |
| 2013/0166964 | A1 | 6/2013 | Jerde et al. |
| 2014/0033176 | A1* | 1/2014 | Rama ............... G06F 11/3688 717/124 |

OTHER PUBLICATIONS

Song et al., "A General Software Defect-Proneness Prediction Framework", IEEE Transactions on Software Engineering, vol. 37, Issue 3, pp. 356-370, May-Jun. 2011.

Ostrand et al., "Where the bugs are, International Symposium on Software Testing and Analysis", ISSTA '04, Jul. 2004, pp. 86-96, 2004.

Ostrand et al., "Can file level characteristics help identify system level fault-proneness?", HVC'11 Proceedings of the 7th international Haifa Verification conference on Hardware and Software: verification and testing, pp. 176-189, 2011.

Adler et al., "Automated substring hole analysis", 31st International Conference on Software Engineering—Companion Volume, May 2009, pp. 203-206.

Ramani et al., "Predicting fault-prone software modules using feature selection and classification through data mining algorithms", 2012 IEEE International Conference on Computational Intelligence and Computing Research ICCIC, Dec. 2012, pp. 1-4.

Yang et al., "A learning-to-rank algorithm for constructing defect prediction models", IDEAL'12 Proceedings of the 13th international conference on Intelligent Data Engineering and Automated Learning, pp. 167-175 , 2012.

Cahill et al., "Predicting Fault-Prone Software Modules with Rank Sum Classification", 22nd Australian Software Engineering conference ASWEC, Jun. 2013, pp. 211-219.

Jin et al., "Artificial neural network-based metric selection for software fault-prone prediction model", Software IET, vol. 6, Issue 6, Dec. 2012, pp. 479-487.

Sandhu et al., "A Density Based Clustering approach for early detection of fault prone modules", International Conference on Electronics and Information Engineering ICEIE, Aug. 2010, pp. 525-530, vol. 2.

Bell et al., "Looking for bugs in all the right places", ISSTA '06 Proceedings of the 2006 International symposium on Software testing and analysis, pp. 61-72, 2006.

Weyuker et al., "A Tool for Mining Defect-Tracking Systems to Predict Fault-Prone Files", Proceeding of MSR 2004, International Workshop on Mining Software Repositories, May 2004, pp. 85-89.

Ratra et al., "Early Prediction of Fault Prone Modules using Clustering Based vs. Neural Network approaches in Software Systems", International Journal of Electronics and Communication Technology, IJECT vol. 2, Issue 4, Oct.-Dec. 2011.

* cited by examiner

UTILIZING SEMANTIC CLUSTERS TO PREDICT SOFTWARE DEFECTS

CROSS-REFERENCE TO RELATED APPLICATIONS

This application is a continuation of U.S. patent application Ser. No. 14/324,191, filed Jul. 6, 2014, which is titled "UTILIZING SEMANTIC CLUSTERS TO PREDICT SOFTWARE DEFECTS" the application of which is incorporated herein by this reference as though fully set forth herein.

TECHNICAL FIELD

The present disclosure relates to software engineering in general, and to software testing, in particular.

BACKGROUND

Software defects caused by coding errors occur through the processes of a programmer making a mistake, which results in a defect in the software source code. If this defect is executed, in certain situations the system will produce wrong results, causing a failure. Not all defects will necessarily result in failures (e.g. defects in dead code). However, a defect can turn into a failure when the environment is changed. Examples of these changes in environment include the software being run on a new computer hardware platform, alterations in source data, or interacting with different software. A single defect may result in a wide range of failure symptoms.

Clearly the increased complexity of software systems nowadays amplifies the probability of software defects, for various reasons. However, there is also a constant pressure to reduce software development time and increase the quality of the software. One way of preserving quality while reducing cost is to optimize the testing process of the software.

In some cases, Quality Assurance (QA) personnel may have to focus their attention at specific elements of the software, such as test those elements, manually review the code of the elements, or the like. Additionally, in case there is a given test suite, only a subset of the tests may be activated to test the system in order to decrease testing time. To this end it may be desirable to identify the more error prone elements, so that the limited available testing and review resources can be mostly allocated for these components.

Some QA personnel may focus on re-checking a software element which has exhibited a defect in the past. However, such methodology does not help in identifying error prone elements whose defects were not yet discovered. That methodology is also not helpful in identifying the more error prone elements out of a collection of new elements introduced to the software.

BRIEF SUMMARY

One exemplary embodiment of the disclosed subject matter is a computer-implemented method comprising: obtaining a plurality of software elements that are associated with a version of a System Under Test (SUT), wherein the plurality of software elements comprise defective software elements which are associated with a defect in the version of the SUT; defining, by a processor, a plurality of clusters, wherein each cluster of the plurality of clusters comprises software elements having an attribute, wherein the attribute is associated with a functionality of the SUT; determining a score of each cluster of the plurality of clusters, wherein the score of a cluster is based on a relation between a number of defect software elements in the cluster and a number of software elements in the cluster; and outputting to a user an indication of scores of clusters.

Another exemplary embodiment of the disclosed subject matter is a computerized apparatus having a processor, the processor being adapted to perform the steps of: obtaining a plurality of software elements that are associated with a version of a System Under Test (SUT), wherein the plurality of software elements comprise defective software elements which are associated with a defect in the version of the SUT; defining a plurality of clusters, wherein each cluster of the plurality of clusters comprises software elements having an attribute, wherein the attribute is associated with a functionality of the SUT; and determining a score of each cluster of the plurality of clusters, wherein the score of a cluster is based on a relation between a number of defect software elements in the cluster and a number of software elements in the cluster.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
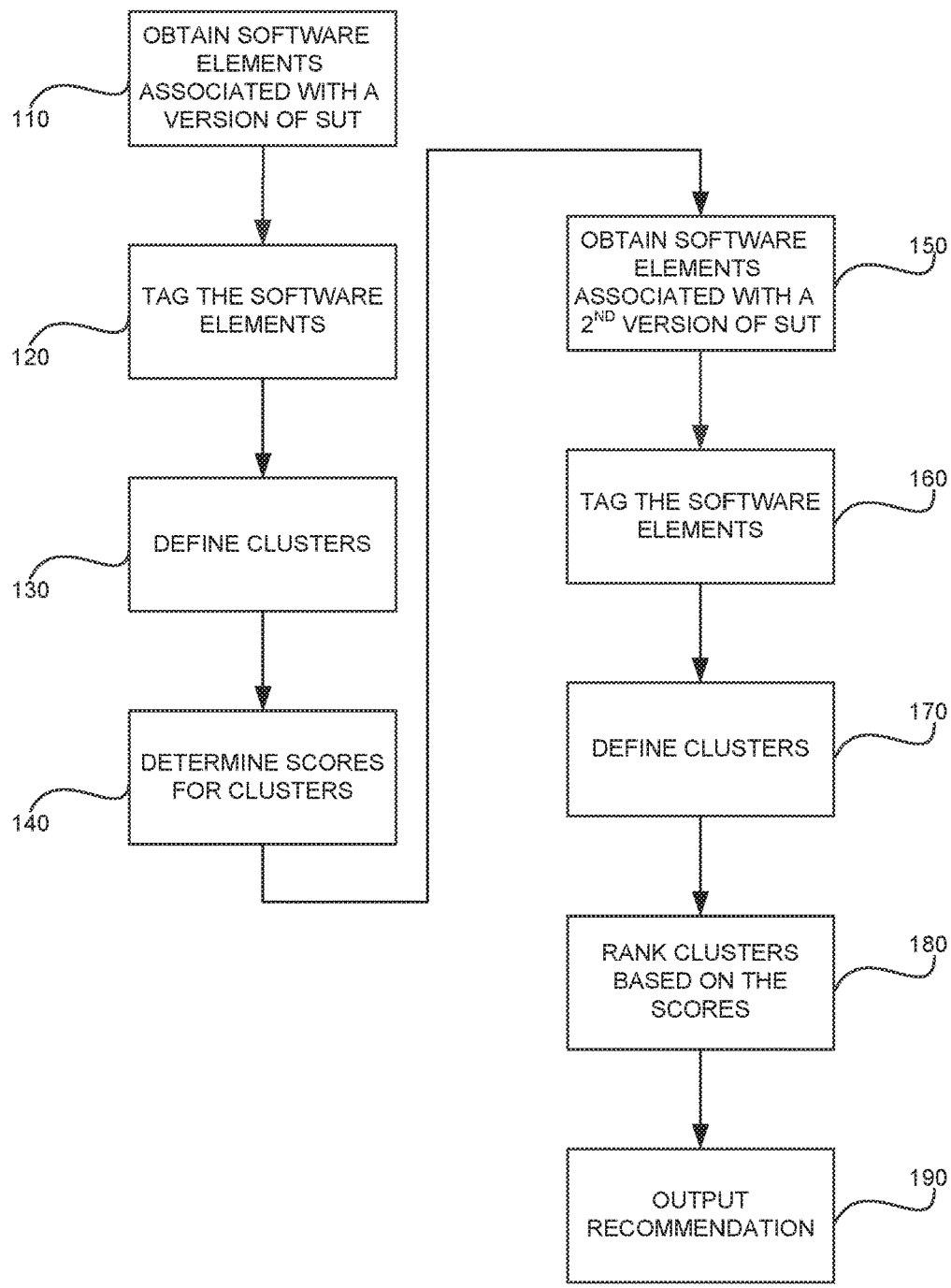
FIG. 1 shows a flowchart diagram of a method, in accordance with some exemplary embodiments of the disclosed subject matter.

One technical problem dealt with by the disclosed subject matter is to identify software elements associated with a version of a System Under Test (SUT) which are believed to have higher likelihood of having a defect. The software elements may be components of the SUT, such as instructions, functions, methods, files, packages, used resources, or similar code elements of the SUT. Additionally or alternatively, the software elements may be testing instructions to test the SUT, such as testing instructions to a tester that are comprised by test descriptions, automatic test instructions comprised by test cases, or the like. Testing efforts of the SUT may be focused to those software elements that are more bug-prone (e.g., either more likely to include a defect in them or more likely to reveal a defect, in case of a testing instruction).

Another technical problem may be to utilize the information available to the QA personnel based on previous testing phases of the SUT (e.g. testing of a previous version of the same SUT) without over fitting the testing process to just those elements which actually exhibited defects in the past. It will be noted that new elements may also introduce defects which could be foreseen based on defects that were identified in similar elements in the past.

One technical solution is to define clusters of software elements. Each cluster may comprise software elements having a common attribute related to the SUT. One example of an attribute may be software elements accessing a specific data structure. As another example, the attribute may be software elements that are associated with a concurrency (e.g., invoke a concurrency predicate, perform locking). As yet another example, the attribute may relate to specific functionality of the SUT, such as perform I/O operations, perform networking operations, perform recovery operations, or the like. As yet another example, the attribute may be that the software element refers to a predetermined variable, object, data structure, class, or similar entity. As yet another example, the attribute may be that the software element makes use of regular expressions. It will be noted that the above is a non-limiting list of potential attributes and other attributes may also be used.

In some exemplary embodiments, the clusters may overlap such that a same software element may be comprised by more than one cluster. As an example, a same line of code may be comprised by a two different clusters based on the line of code having two different attributes, each associated with a different cluster. For example, the code of line may be associated with performing recovery actions on the one hand and may access a specific variable on the other hand, thereby the line of code may be comprised by a first cluster of recovery actions and by a second cluster of accessing the specific variable.

In some exemplary embodiments, each cluster may be scored based on a number of defects in the elements it comprises. In some exemplary embodiments, the score may be based on a relation (such as for example a ratio) between a number of defects and a number of software elements in the cluster. Based on the scores, the clusters may be ranked and ordered for testing so as the clusters with higher scores may be deemed more important to test while the clusters with lower scores may be deemed less important to test. Based on the scores, QA personnel may prioritize testing activities with respect to the SUT.

In some exemplary embodiments, the score of a cluster may represent a probability that a software element comprised in the cluster will be associated with a defect. The score may represent the probability that a software element having the same attribute as the cluster will be associated with a defect.

In some exemplary embodiments, the clusters may be scored based on defects found in a version of the SUT, while the testing determination may be with respect to a second version of the SUT, such as, for example, a successive version of the version. Based on historic information regarding defects that were discovered in the version, testing activities may be prioritized with respect to the second version. In some exemplary embodiments, as a result, the disclosed subject matter may inherently identify potential defects in software elements that were introduced in the new version or in software elements that never exhibited defects themselves based on their similarity to other error-prone software elements. In some exemplary embodiments, the underlying cause of the defect may be based on a team providing lower quality products (e.g., the team responsible for I/O operations providing lower quality code), based on difficulties that are specific to the SUT (e.g., class X is a complicated class that introduces many unintentional outcomes when used throughout the SUT), or the like. The disclosed subject matter may determine higher probability of defects in software elements based on such underlying causes without explicitly detecting the underlying causes but rather based on their manifestation in a previous version of the SUT.

One technical effect of utilizing the disclosed subject matter is to provide for priorities to perform QA activities with respect to software elements. The priorities may be based on historic information regarding defects discovery in the SUT. In some exemplary embodiments, the priorities may not provide specific precedent to software elements that have actually exhibited defects in the past, thereby allowing giving precedent to new software elements or software elements that never exhibited a defect in the past. For example, consider a first cluster which comprises many software elements and only one software elements that exhibited a defect. Consider a second cluster which comprises a few software elements, some of them are new, and some of them have exhibited a defect in the past. The disclosed subject matter may determine to give precedent to testing the new software elements of the second cluster over the software element that exhibited the defect in the past that is comprised by the first cluster.

Another technical effect of utilizing the disclosed subject matter is to facilitate a correlation between the defects and a developer or a team responsible for developing portions of the SUT. In some cases, the underlying cause of defects may be a specific person or a team which is responsible for an aspect of the SUT, such as a specific activity of the SUT. By defining a cluster to correlate with the specific activity, and in case the defects rate produced by the developer or team of developers is higher than the average rate of the entire development unit, the cluster may be given higher priority than other clusters and the QA personnel may give precedent to performing QA activities with respect to software elements that are associated with the developer or team of developers. In some cases, one may determine association between defects and developers or group of developers to identify such issues and notify about potential issues with the developers or group of developers.

Yet another technical effect is to automatically utilize historic information regarding past QA activities in order to prioritize QA activities with respect to the same SUT in future cases. In some exemplary embodiments, historic data from other projects, such as other SUTs, may be imported to provide a base line for a new SUT being developed, based on a similarity between the SUTs and/or between the identity of developers or teams of developers that develop them. In some exemplary embodiments, historic data from various of versions may also be aggregated, such as by summing a total number of software elements in all versions that correlate to a specific attribute and determining a total number of software elements being associated with a defect among them.

Referring now to FIG. 1 showing a flowchart diagram of a method, in accordance with some exemplary embodiments of the disclosed subject matter.

In Step 110, software elements that are associated with an SUT may be obtained. In some exemplary embodiments, the software elements are associated with a version of the SUT. Additionally or alternatively, the software elements may be associated with a set of versions, such as all elements that are associated with a first version and a second version may be obtained, including duplication or without including duplication. The software elements may be obtained from a computer readable media, from a remote device, from the user, or the like. In some exemplary embodiments, the software elements may be comprised by the SUT, such as in case the software elements are code products (e.g., code lines, code files, functions, or the like). Additionally or alternatively, the software elements may be associated with testing the SUT, such as testing instructions, either for automatic testing or manual testing. In some exemplary embodiments, the software elements may be associated with a version of the SUT which was tested and for which defects were discovered. In some exemplary embodiments, a portion of the software elements may be defective software elements which are associated with a defect in the SUT. As an example, a defective software element may be a code line in which a defect was discovered. As another example, a defective software element may be a testing instruction which caused the SUT to exhibit a defect.

In accordance with some exemplary embodiments of the disclosed subject matter, the SUT may be a software program or application that is being tested for correct operation and the intent of finding defects. In some exemplary embodiments, the SUT may be a program undergoing a software development process where each version of the SUT may be a millstone in the development process.

In Step 120, the software elements may be tagged with tags, each of which corresponds to an attribute. In some exemplary embodiments, the attribute may relate to a semantic functionality of the SUT, such as a functionality performed by the SUT. As an example, the software element may have an attribute that indicates accessing a predetermined data structure of the SUT, invoking a function of a predetermined component of the SUT, using a predetermined variable of the SUT, performing recovery functionality, performing Input/Output (I/O) functionality, using concurrency functionality, or any other similar functionality. In some exemplary embodiments, the attribute does not relate to QA measurement of the SUT, such as, for example, whether the software element is a defective software element. In some exemplary embodiments, the attribute may be orthogonal to QA measurements of software elements.

In some exemplary embodiments, a single software element may have more than a single attribute. Accordingly, in Step 120, the single software element may be tagged by a plurality of tags correlating to the attributes of the software element.

In Step 130, a plurality of clusters may be defined. Each cluster may be associated with an attribute and may comprise all software elements having the attribute. In some cases, a cluster may comprise all software elements that are tagged with a tag associated with the attribute of the cluster. In some exemplary embodiments, a single software element may be comprised by several clusters, such as in case of a software element that is tagged by more than a single tag. In some exemplary embodiments, because the clusters are not disjoint sets, there may be an overlap between clusters. In some embodiments, a cluster may be defined by a logic combination of multiple tags (e.g., tags X and Y are present, but tag Z is not).

In Step 140, clusters may be scored. In some exemplary embodiments, for each cluster a score may be determined based on the software elements comprised by the cluster. In some exemplary embodiments, the score may be computed based on a relation between a number of defective software elements in the cluster and a number of software elements in the cluster. As an example, in case the cluster comprises a total of 100 software elements, 20 of which are defective software elements, the score may be computed as the ratio (e.g., 20%) or based on the two figures and their relations.

In some exemplary embodiments, the score of a cluster may be computed using the following formula: $DSE \div \sqrt{SE}$, where SE may be a total number of software elements in a cluster, and DSE may be a total number of defective software elements in the cluster. Referring again to the above example, the score for the exemplary cluster may be $20 \div \sqrt{100} = 2$.

In some exemplary embodiments, the score of the cluster may be computed using statistical functions. As an example, the score may be based on a cumulative binomial distribution function. The score may be computed using the following formula: $1-B(DSE, SE, P)$. In this formula, SE and DSE may be a total number of software elements and defective software elements in the cluster, respectively. P may be a ratio between a total of defective software elements associated with the version of the SUT and a total of software elements associated with the version of the SUT, and where B is a cumulative binomial distribution function. Referring again to the example above, and assuming that the total number of software elements is 25,000 and there are a total of 1,500 defective software elements, the average probability that a software element will be defective is 6%. Accordingly, P may be 2%. B(20, 100, 6%) defines a cumulative probability that out of 100 "trails" (e.g., randomly selected software elements), 20 or less will be defective software elements, when the average probability that any software element may be defective is 6%. The cumulative probability may be 0.99919243. The score may be computed based on the probability, such as by multiplying the probability by $-1$, such as by computing $1-B$. In case the formula is $1-B(DSE, SE, P)$, the score may be 0.00080757. In case the score is below a confidence threshold, $\alpha$, the cluster may be determined to be inconsistent with the general defect density in the population and therefore may be identified as potentially bug-prone. In case of another cluster, in which there are only 2 defective software elements, out of a total of 120 software elements, the score may be computed to be 0.97749622, which may be above the confidence threshold. As a result the other cluster may be deemed as not bug prone as it is consistent with the general defect density of the population. In some exemplary embodiments, the confidence threshold may be predetermined, may be provided by the user, or the like. In some exemplary embodiments, the confidence threshold may be determined as a median of the scores, a certain percentile of the scores, such as the 20-th percentile, or the like.

In some exemplary embodiments, the score of a cluster may represent the estimated likelihood of a software element having the same attribute as the cluster to be defected. In some exemplary embodiments, scores may be a number between 0 to 1. In some exemplary embodiments, a low score may represent low likelihood, such as in case of the $DSE \div \sqrt{SE}$ formula. Additionally or alternatively, a low score may represent high likelihood, such as in case of the $1-B(DSE, SE, P)$ formula.

In Step 150, SEs' associated with a second version of the SUT may be obtained. In some exemplary embodiments, Step 150 redoes the method depicted in Step 110 for the 2nd version of the SUT that was obtained in Step 110. In some exemplary embodiments, the SE's of the 2nd version of the SUT may comprise different amount of SE's with respect to the version of the SUT. Additionally or alternatively, the SE's of the 2nd version may comprise different type of SE's with respect to the version. Additionally or alternatively, defective SE's of the version may appear to be working properly in the 2nd version and vice versa.

In Step 150 and Step 160, software elements of a second version of the SUT may be obtained and tagged. Steps 150 and 160 may be similar to Steps 110 and 120. In some exemplary embodiments, the second version may or may not be a successive version to the version referred to in Step 110. In some exemplary embodiments, the second version may be currently undergoing or planned to be undergoing QA activities. It will be noted that the second version may comprise software elements that were already comprised by the version as well as software elements that were not previously comprised by the version. In some exemplary embodiments, the second version may not include some software elements that were comprised by the version (e.g., some original software elements may have been modified or deleted). In some exemplary embodiments, the software elements of the second version may be of different type than those of the version (e.g., software elements of the version may be code lines while software elements of the second version may be test instructions).

In Step 170, clusters are defined in a similar manner to the cluster definition of Step 130. The clusters may be defined with respect to the second version of the SUT.

In Step 180, the clusters may be ranked based on the scores. The clusters of the second version may be ranked based on the scores of the clusters of the first version computed in Step 140. In some exemplary embodiments, a cluster associated with the second version may be ranked based on a score of a corresponding cluster that is associated with the first version. In some exemplary embodiments, clusters may correspond if they have the same attributes. In some exemplary embodiments, each cluster may be scored based on the score of the corresponding cluster and based on the scores the clusters may be ranked. The clusters may be ranked by sorting the clusters in accordance with the respective scores.

It will be noted that in some embodiments, the clusters of the first version may be ranked based on their determined scores. Additionally or alternatively, the ranking may be performed with respect to the attributes that define the clusters.

In Step 190, recommendations may be outputted to a user. In some exemplary embodiments, a list of ranked clusters, tags, or attributes may be outputted to the user. Additionally or alternatively, a list of clusters, tags, or attributes may be outputted along with their corresponding scores. Additionally or alternatively, a top percentile of the clusters may be outputted, such as top 10% of the clusters. Additionally or alternatively, the output may include clusters that include a total number of software elements that is between a predetermined threshold, such as about 15% of all software elements of the SUT. As an example, after adding the highest ranked cluster, it may be determined whether the threshold was reached. If the range was not reached, the next highest ranked cluster may be added and the threshold may be checked again. Such addition may be performed iteratively until the threshold is reached. In some exemplary embodiments, the recommendation may include a recommendation to review the software elements of the clusters, such as by testing for defects in the software elements, performing code review of the software elements, or the like.

It will be noted that in some cases, the recommendation may include a recommendation to review some of the software elements that are comprised by the second version of the SUT but are not comprised by the first version of the SUT (e.g., some of new software elements). Additionally or alternatively, the recommendation may include a recommendation to review a software element that was comprised by both versions (e.g., an old software element) even though the software element has not exhibited a defect in the first version. Additionally or alternatively, the software element may not have any textual resemblance to any software element that did exhibit a defect in the first version, but may be associated with a same semantic property that was associated with a relatively large number of defects in the first version (either in absolute or relative terms).

Figure 2:
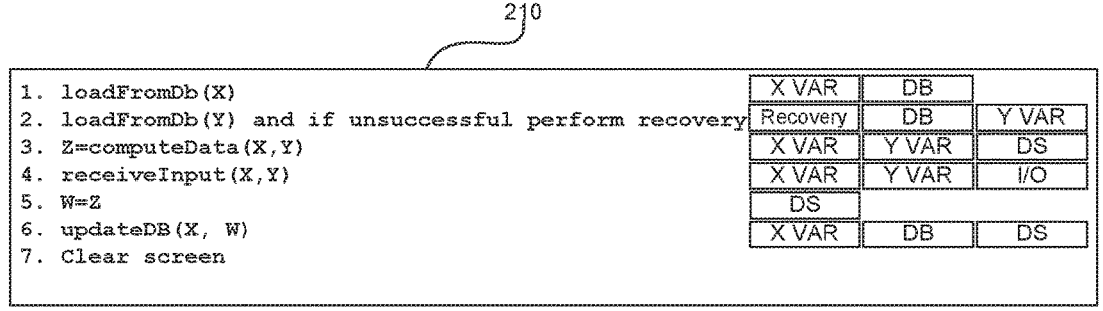
FIG. 2 shows illustrations of software elements, in accordance with some exemplary embodiments of the disclosed subject matter.
Figure 2:
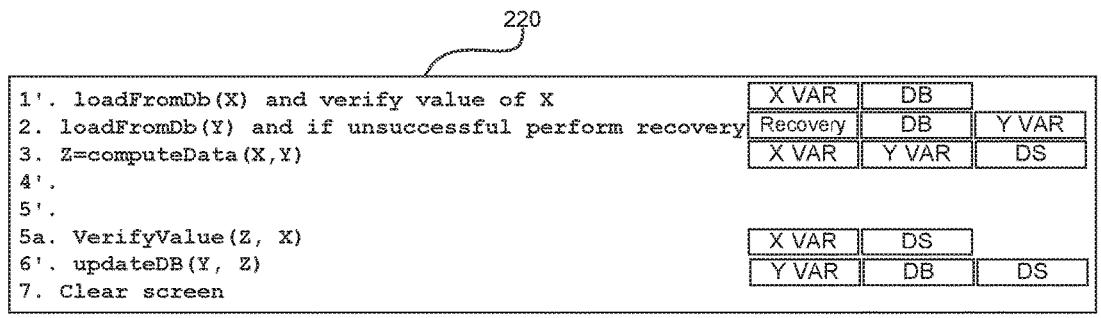

Referring now to FIG. 2 showing a schematic example of software elements of an SUT, in accordance with some exemplary embodiments of the subject matter.

Version 210 of an SUT may be comprised of software elements, such as code lines. Code lines may be tagged in accordance with their functionality. As an example, a code line that makes use of the variable X may be tagged by the "X var" tag. Similarly, a code line that makes use of the variable Y may be tagged by the "Y var" tag. A code line that accesses a database may be tagged by the "DB" tag. A code line that is associated with an I/O operation may be tagged by the "I/O" tag. A code line that performs some recovery operations may be tagged by the "Recovery" tag. A code line that makes use of a specific data structure is tagged with the "DS" tag. Referring to the "DS" tag, it will be noted that both the Z and W variables in Version 210 are instances of the specific data structure and therefore any instruction that access them is tagged with the "DS" tag.

As can be appreciated, a single software element may be tagged by more than a single tag. In this example, code line 2 is tagged with three different tags.

Based on the tags, clusters may be determined. The "X var" cluster may include lines 1, 3, 4, and 6. The "Recovery" cluster may include line 2. The "DB" cluster may include lines 1, 2, and 6.

In some exemplary embodiments, a software element may not be associated with any tag, such as in case of line 7.

Version 220 of the SUT depicts a second version of the same SUT as that of Version 210. Version 220 may include some modifications to Version 210, including addition of new lines, deletion of exiting lines and modification of exiting lines. Accordingly, the tagging of Version 220 may be different. Based on the defective software elements of Version 210, scores may be determined to clusters and corresponding clusters of Version 220 may be ranked so as to provide a recommendation as to where one should invest in his or her QA efforts with respect to Version 220 and when taking into account the defects that were discovered in Version 210.

Figure 3:
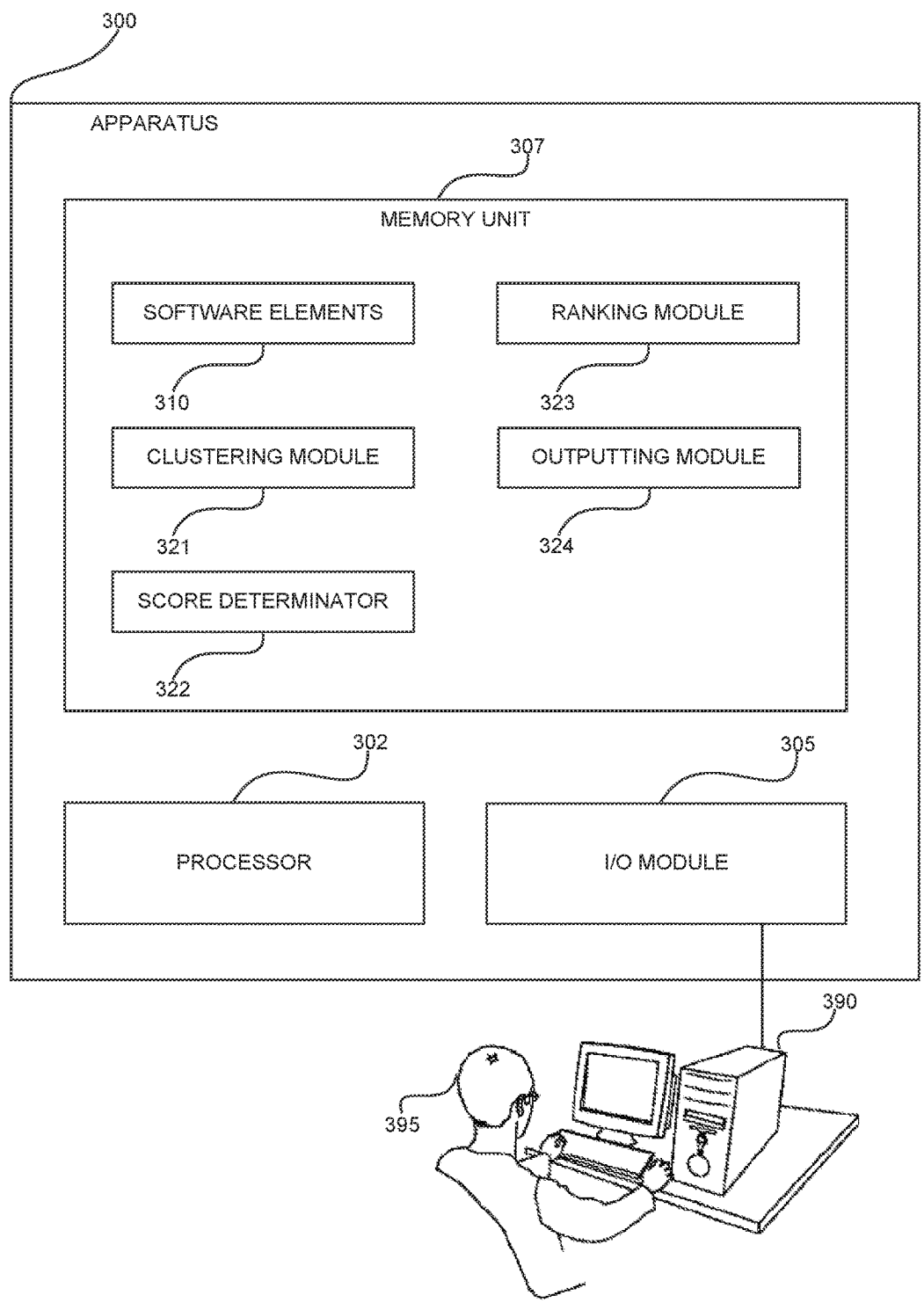
FIG. 3 shows a computerized environment in which the disclosed subject matter is used, in accordance with some exemplary embodiments of the subject matter.

Referring now to FIG. 3 showing an apparatus in accordance with some exemplary embodiments of the disclosed subject matter. Apparatus 300 may be a computerized apparatus adapted to perform methods such as depicted in FIG. 1.

In some exemplary embodiments, Apparatus 300 may comprise a Processor 302. Processor 302 may be a Central Processing Unit (CPU), a microprocessor, an electronic circuit, an Integrated Circuit (IC) or the like. Processor 302 may be utilized to perform computations required by Apparatus 300 or any of it subcomponents.

In some exemplary embodiments of the disclosed subject matter, Apparatus 300 may comprise an Input/Output (I/O) Module 305. I/O Module 305 may be utilized as an interface to transmit and/or receive information and instructions between Apparatus 300 and external I/O devices, such as a Workstation 390, or the like. In some exemplary embodiments, I/O Module 305 and Workstation 390 may be used to provide an interface to a User 395, such as by providing output, visualized results, reports, or the like. User 395 may further provide input to Apparatus 300 via Workstation 390, such as parameters, commands, indicating a location of a version of an SUT, or the like.

In some exemplary embodiments, Apparatus 300 may comprise a Memory Unit 307. The Memory Unit 307 may be a hard disk drive, a Flash disk, a Random Access Memory (RAM), a memory chip, or the like. In some exemplary embodiments, Memory Unit 307 may retain program code operative to cause Processor 302 to perform acts associated with any of the subcomponents of Apparatus 300.

In some exemplary embodiments, Memory Unit 307 may retain computer readable data, such as Software Elements 310. Additionally or alternatively, Memory Unit 307 may retain components such as a Clustering Module 321, a Score Determinator 322, a Ranking Module 323, an Outputting Module 324, or the like.

Software Elements 310 may be obtained by Apparatus 300, such as via I/O Module 305 from an external source. In some exemplary embodiments, Software Elements 310 are associated with a specific version of an SUT.

Clustering Module 321 may be configured to define clusters of software elements. Each cluster may be defined by one attribute or more. The attribute may be selected or identified by User 395. In some exemplary embodiments, the attribute may be correlate to one or more tags. Clustering Module 321 may be based on tagging of Software Elements 310 with tags that indicate, for each software element, the attributes that the software elements has. The tagging may be performed automatically or manually. Automatic tagging may be performed by invoking a function "tagX(Software Element)" which returns true of the software element should be tagged with X or false otherwise. The function may be defined, programmed, provided, or selected by User 395, thereby providing a configurable system that can adhere to any type of user defined attribute.

Score Determinator 322 may be configured to determine a score for a cluster based on a relation between the number of defective software elements in the cluster and the number of software elements in the cluster. The score may be determined based on defective software elements information with respect to the version. The scores may be used for corresponding clusters in other versions of the SUT.

Ranking Module 323 may be configured to rank clusters based on the scores determined by Score Determinator 322. Ranking Module 323 may rank corresponding clusters to those that Score Determinator 322 has processed.

Outputting Module 324 may be configured to output information to User 395. In some exemplary embodiments, Output Module 324 may output a report indicating priorities of QA tasks based on the ranking of the clusters.

In some exemplary embodiments, software elements may be clustered automatically into labels based on their attributes. In some exemplary embodiments, a machine learning tool may utilize the obtained information regarding a first version as a training set to train the machine learning tool to classify software elements of a second version based on their attributes. The machine learning tool may classify a software element based on the one or more attributes (or tags) that are associated with the software element. The labels may be, for example, a set of discrete labels, such as "potentially defective" and "presumed good".

In some exemplary embodiments, the machine learning tool may predict a score for each software element. The score may be a number, such as between the range of zero to one. A score for each software element may be defined as a function (e.g., average, weighted average, median, maximum, minimum) of the scores of all the clusters that comprise the software element (e.g., all the attributes of the software element). Such scores may be computed with respect to the software elements of the first version and may be used to train the machine learning tool to predict a score for other software elements based on their attributes.

In some exemplary embodiments, a score of a software element may be used for purposes other than machine learning, such as for example, for ranking software elements for testing purposes, for filtering software elements that are considered less probable to be defective based on their score (e.g., score above a predetermined threshold), or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computerized apparatus having a processor, the processor being adapted to perform a method for testing software systems, the method comprises:

obtaining a plurality of software elements that are associated with a version of a computer program, wherein the plurality of software elements comprise defective software elements which are associated with a defect in the version of the computer program;

defining a plurality of clusters, wherein each cluster of the plurality of clusters comprises software elements having an attribute, wherein the attribute is associated with a functionality of the computer program;

determining a score of each cluster of the plurality of clusters, wherein the score of a cluster is based on a relation between a number of defect software elements in the cluster and a number of software elements in the cluster;

wherein said determining the score comprises computing the score by using a total number of software elements in the cluster, a total number of defective software elements in the cluster, and a ratio between a total number of defective software elements that are associated with the version of the computer program and a total number of software elements that are associated with the version of the computer program; and testing a second version of the computer program, wherein said testing comprises prioritizing testing activities based on scores of the plurality of clusters, wherein said testing the second version of the computer program comprises executing the second version of the computer program by a computerized system having computational resources;

thereby identifying defects in new software elements of the second version of the computer program that never exhibit defects based on similarity between the new software elements and other bug-prone software elements in the version of the computer program, whereby utilizing the computational resources to efficiently detect defects in the second version of the computer program.

2. The computerized apparatus of claim 1, wherein the plurality of clusters comprises a first cluster and a second cluster, wherein the first cluster comprises a software element and the second cluster comprises the software element, whereby the first cluster and the second cluster are overlapping.

3. The computerized apparatus of claim 1, wherein the processor is further adapted to perform:
prior to said testing:
defining a second plurality of clusters, wherein each cluster of the second plurality of clusters comprises software elements of a second version of the computer program, wherein each cluster of the second plurality of clusters is associated with an attribute;
ranking the second plurality of clusters based on the scores of the plurality of clusters, wherein a cluster of the second plurality of clusters is ranked based on a score of a corresponding cluster in the plurality of clusters that is associated with a same attribute.

4. The computerized apparatus of claim 1, wherein the processor is further adapted to perform:
training a machine learning tool to make a prediction for a software element, wherein said training comprises:
computing a score for each software element of the plurality of software elements, wherein the score of a software element is based on scores of cluster comprising the software element; and
providing the machine learning tool with pairs of sets of attributes and scores, wherein each pair corresponds to a software element and its associated score;
obtaining a second software element having a set of one or more attributes; and
predicting, by the machine learning tool, a prediction with respect to the software element based on the set of one or more attributes.

5. The computerized apparatus of claim 1, wherein said determining the score comprises computing the score by using the formula 1−B(DSE,SE,P), wherein SE is the total number of software elements in the cluster, wherein DSE is the total number of defective software elements in the cluster, wherein P is the ratio between the total number of defective software elements that are associated with the version of the computer program and the total number of software elements that are associated with the version of the computer program, and wherein B is a cumulative binomial distribution function.

6. The computerized apparatus of claim 1, wherein said determining the score comprises computing the score by using the formula: $DSE \div \sqrt{SE}$, wherein SE is the total number of software elements in the cluster, wherein DSE is the total number of defective software elements in the cluster.

7. A computer-implemented method for testing of software systems, comprising:
obtaining a plurality of software elements that are associated with a version of a computer program, wherein the plurality of software elements comprise defective software elements which are associated with a defect in the version of the computer program;
defining a plurality of clusters, wherein each cluster of the plurality of clusters comprises software elements having an attribute, wherein the attribute is associated with a functionality of the computer program;
determining a score of each cluster of the plurality of clusters, wherein the score of a cluster is based on a relation between a number of defect software elements in the cluster and a number of software elements in the cluster;
wherein said determining the score comprises computing the score by using a total number of software elements in the cluster, a total number of defective software elements in the cluster, and a ratio between a total number of defective software elements that are associated with the version of the computer program and a total number of software elements that are associated with the version of the computer program; and
testing a second version of the computer program, wherein said testing comprises prioritizing testing activities based on scores of the plurality of clusters, wherein said testing the second version of the computer program comprises executing the second version of the computer program by a computerized system having computational resources;
thereby identifying defects in new software elements of the second version of the computer program that never exhibit defects based on similarity between the new software elements and other bug-prone software elements in the version of the computer program, whereby utilizing the computational resources to efficiently detect defects in the second version of the computer program.

8. The computer-implemented method of claim 7, wherein the plurality of clusters comprises a first cluster and a second cluster, wherein the first cluster comprises a software element and the second cluster comprises the software element, whereby the first cluster and the second cluster are overlapping.

9. The computer-implemented method of claim 7, wherein the processor is further adapted to perform:
prior to said testing:
defining a second plurality of clusters, wherein each cluster of the second plurality of clusters comprises software elements of a second version of the computer program, wherein each cluster of the second plurality of clusters is associated with an attribute;
ranking the second plurality of clusters based on the scores of the plurality of clusters, wherein a cluster of the second plurality of clusters is ranked based on a score of a corresponding cluster in the plurality of clusters that is associated with a same attribute.

10. The computer-implemented method of claim 7, wherein the processor is further adapted to perform:
training a machine learning tool to make a prediction for a software element, wherein said training comprises:
computing a score for each software element of the plurality of software elements, wherein the score of a software element is based on scores of cluster comprising the software element; and
providing the machine learning tool with pairs of sets of attributes and scores, wherein each pair corresponds to a software element and its associated score;
obtaining a second software element having a set of one or more attributes; and
predicting, by the machine learning tool, a prediction with respect to the software element based on the set of one or more attributes.

11. The computer-implemented method of claim 7, wherein said determining the score comprises computing the score by using the formula 1−B(DSE,SE,P), wherein SE is the total number of software elements in the cluster, wherein DSE is the total number of defective software elements in the cluster, wherein P is the ratio between the total number of defective software elements that are associated with the version of the computer program and the total number of software elements that are associated with the version of the computer program, and wherein B is a cumulative binomial distribution function.

12. The computer-implemented method of claim 7, wherein said determining the score comprises computing the score by using the formula: $DSE \div \sqrt{SE}$, wherein SE is the total number of software elements in the cluster, wherein DSE is the total number of defective software elements in the cluster.

* * * * *